Patented Oct. 31, 1944

2,361,539

UNITED STATES PATENT OFFICE 2,361,539

METHOD OF PRODUCING DIOLEFINS

Wilhelm Friedrichsen, Ludwigshafen-on-the-Rhine, Germany; vested in the Alien Property Custodian No Drawing. Application February 5, 1941, Serial No. 377,513. In Germany February 21, 1940

7 Claims. (Cl. 260—681)

The present invention relates to an improved method for the production of diolefins, in particular aliphatic diolefinic hydrocarbons having conjugated double linkages.

I have found that aliphatic diolefinic hydrocarbons having conjugated double linkages are obtained in a simple manner by contacting 1.3-dioxanes which are substituted at least once in the 4- or 5-position by the radicle of a hydrocarbon of the paraffin series in the gas phase with solid catalysts promoting the splitting off of water in the presence of vaporized organic compounds which are liquid under ordinary conditions and which do not decompose under reaction conditions.

The 1.3-dioxanes serving as starting materials according to my invention may be prepared from monoolefinic aliphatic hydrocarbons by the action of formaldehyde in the liquid phase in the presence of an acid catalyst. The reaction is preferably carried out in an inert solvent, such as water, benzene, toluene or halogenated hydrocarbons, such as methylene chloride or dichlorethylene, at temperatures between room temperature and about 150° C. Suitable acid catalysts are in particular mineral acids, such as hydrochloric acid, phosphoric acid or sulfuric acid, or acid reacting salts, such as zinc chloride. Suitable olefins are straight-chain or branch-chain aliphatic olefins, such as propylene, n-butylene, n-hexene, iso-butylene, iso-amylene, iso-hexene and their higher homologues. The formation of 1.3-dioxanes may be explained according to the following equations:

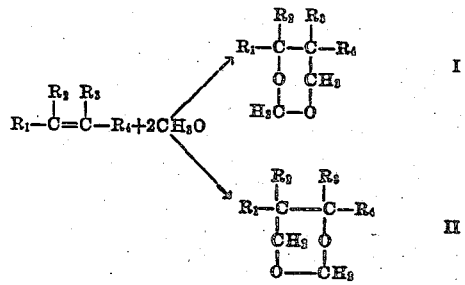

wherein $R_1$ stands for a paraffinic hydrocarbon radicle, and wherein $R_2$, $R_3$ and $R_4$ stand for hydrogen or paraffinic hydrocarbon radicles. The dioxanes corresponding to Formula I constitute the main products.

The 1.3-dioxanes containing in the dioxane ring a carbon atom attached to three carbon atoms and one oxygen atom or a carbon atom attached to four carbon atoms may also be prepared by heating a tertiary aliphatic alcohol with formaldehyde in the presence of an acid catalyst under the reaction conditions as described above for the preparation of 1.3-dioxanes from olefins.

As solid dehydrating catalysts promoting the conversion of 1.3-dioxanes into 1.3-diolefins there may be mentioned in particular those which have proved suitable for the preparation of unsaturated hydrocarbons from alcohols. These are especially phosphoric acid salt catalysts having an acid reaction under the reaction conditions such as the salts of oxygen acids of phosphorus which have been proposed as catalysts in the U. S. Patent 1,841,055 and which include not only the so-called acid salts of the various phosphorus acids but also such neutral salts as have an acid action under the reaction conditions. Silicic acid gel or aluminum oxide are also suitable.

The temperatures to be maintained lie, generally speaking, between about 150° C. and 450° C., advantageously between 200 and 300° C. It is preferable, though not necessary, to use an inert diluent, such as nitrogen or steam in addition to the vaporized organic compound which is liquid under normal condtions.

Suitable organic liquids are in particular such compounds which are inert under the reaction conditions, as for example, aliphatic and aromatic hydrocarbons, such as n-hexane, iso-hexane, cyclohexane and its homologues, benzene and its homologues or liquid mixtures of hydrocarbons, or halogenated hydrocarbons, such as tetrachlor methane. There may also be used as the organic diluent the 1.3-dioxanes themselves. This may be done by passing the vaporized 1.3-dioxane with such a speed through the reaction chamber that only part thereof is decomposed, the remaining part leaving the chamber unchanged.

The amount of the vaporized liquid may vary to a considerable extent. There may be used one, two, five or six molecular proportions thereof for each molecular proportion of the 1.3-dioxane to be converted. I prefer to lead the vaporized organic compound in a cycle, by separating it from the reaction products after the reaction gases have emerged from the reaction vessel. Generally speaking, these vapors may be easily separated into the constituents, e. g. into the diolefin, water and formaldehyde and the organic liquid diluent, by fractional distillation.

The following examples illustrate certain ways in which the principle of my invention may be applied, but are not to be construed to limit the invention. The parts are by weight, unless otherwise stated.

Example 1

100 parts of anhydrous primary sodium phosphate are dissolved in 40 parts of water and mixed with 8 parts of primary n-butylamine phosphate together with 20 parts of graphite. The product is then evaporated while stirring and the solidified mass is finally heated to 160° C. After cooling down, the mass is broken up into pieces of the desired size and is screened, and the granules thus obtained are employed as the catalyst.

500 cubic centimeters of a mixture consisting of 3 parts of n-heptane and 1 part of the crude reaction product obtained by condensing isobutylene with an aqueous formaldehyde solution in the presence of phosphoric acid, which product contains 69 per cent of 4.4-dimethyl-1.3-dioxane, 20 per cent of tertiary butyl alcohol, 10.2 per cent of water and 0.8 per cent of higher boiling constituents are vaporized per hour and led with 120 grams of steam over 4.5 liters of the catalyst at 250° C. The vapors emerging from the catalyst are condensed and the condensate led into a column in order to obtain two fractions. The first fraction consists of easily volatile compounds, namely isoprene and isobutylene formed from tertiary butyl alcohol. The second fraction consists of water containing formaldehyde, heptane and unchanged dimethyl-1.3-dioxane. Heptane and unchanged dimethyl-1.3-dioxane are separated off, admixed with fresh dimethyl-1.3-dioxane and again led into the reaction chamber. The first fraction is distilled whereby pure isoprene is obtained.

8,956 parts of isoprene are thus obtained from 21,888 parts of dimethyl-1.3-dioxane in the course of 485 hours.

Example 2

1000 cubic centimeters of the crude dimethyl-1.3-dioxane described in Example 1 and 220 cubic centimeters of water are vaporized per hour and the vapors led over 4.5 liters of the catalyst described in Example 1 at 250° C. Less than half of the dioxane is converted under these conditions, the remainder being left unchanged. The vapors emerging from the catalyst are led into a column and separated into two fractions. The first fraction consists of isoprene and isobutylene from which pure isoprene may easily be recovered. The second fraction consists of water, formaldehyde and dimethyl-1.3-dioxane. Water and dimethyl-1.3-dioxane are led back into the reaction vessel.

In the course of 100 hours 15,550 parts of dimethyl-1.3-dioxane are thus converted into 6,927 parts of isoprene.

What I claim is:

1. A process for the production of aliphatic hydrocarbons containing conjugated double linkages which consists in subjecting in the gas phase at temperatures between about 150° and about 450° C. a 1.3-dioxane substituted at least once in one of the positions 4 and 5 by a paraffinic hydrocarbon radicle to the action of a solid dehydration catalyst in the presence of at least one molecular proportion of a vaporized normally liquid organic compound which remains unchanged under reaction conditions.

2. A process for the production of aliphatic hydrocarbons containing conjugated double linkages which consists in subjecting in the gas phase at temperatures between about 150° and about 450° C. a 1.3-dioxane substituted at least once in one of the positions 4 and 5 by a paraffinic hydrocarbon radicle to the action of a solid dehydration catalyst in the presence of steam and of at least one molecular proportion of a vaporized normally liquid organic compound which remains unchanged under reaction conditions.

3. A process for the production of aliphatic hydrocarbons containing conjugated double linkages which consists in subjecting in the gas phase at temperatures between about 150° and about 450° C. a 1.3-dioxane substituted at least once in one of the positions 4 and 5 by a paraffinic hydrocarbon radicle to the action of a solid dehydration catalyst comprising the salt of an oxygen acid of phosphorus having an acid reaction under reaction conditions in the presence of steam and of at least one molecular proportion of a vaporized normally liquid organic compound which remains unchanged under reaction conditions.

4. A process for the production of aliphatic hydrocarbons containing conjugated double linkages which consists in subjecting in the gas phase at temperatures between about 150° and about 450° C. a 1.3-dioxane substituted at least once in one of the positions 4 and 5 by a paraffinic hydrocarbon radicle to the action of a solid dehydration catalyst comprising the salt of an oxygen acid of phosphorus having an acid reaction under reaction conditions in the presence of steam and of at least one molecular proportion of a vaporized normally liquid hydrocarbon which remains unchanged under reaction conditions.

5. A process for the production of isoprene which consists in subjecting in the gas phase at temperatures between about 150° and about 450° C. 4.4-dimethyl-1.3 dioxane to the action of a solid dehydration catalyst comprising the salt of an oxygen acid of phosphorus having an acid reaction under reaction conditions in the presence of steam and of at least one molecular proportion of a vaporized normally liquid hydrocarbon which remains unchanged under reaction conditions.

6. A process for the production of aliphatic hydrocarbons containing conjugated double linkages which consists in subjecting in the gas phase at temperatures between about 150° and about 450° C. a 1.3-dioxane substituted at least once in one of the positions 4 and 5 by a paraffinic hydrocarbon radicle to the action of a solid dehydration catalyst comprising the salt of an oxygen acid of phosphorus having an acid reaction under reaction conditions in the presence of steam and such an excess of the 1.3-dioxane that at least one-half thereof remains unchanged under reaction conditions.

7. A process for the production of isoprene which consists in subjecting in the gas phase at temperatures between about 150° and about 450° C. 4.4-dimethyl-1.3-dioxane to the action of a solid dehydration catalyst comprising the salt of an oxygen acid of phosphorus having an acid reaction under reaction conditions in the presence of steam and such an excess of the 1.3-dioxane that at least one-half thereof remains unchanged under reaction conditions.

WILHELM FRIEDRICHSEN.